United States Patent Office 3,532,970
Patented Oct. 6, 1970

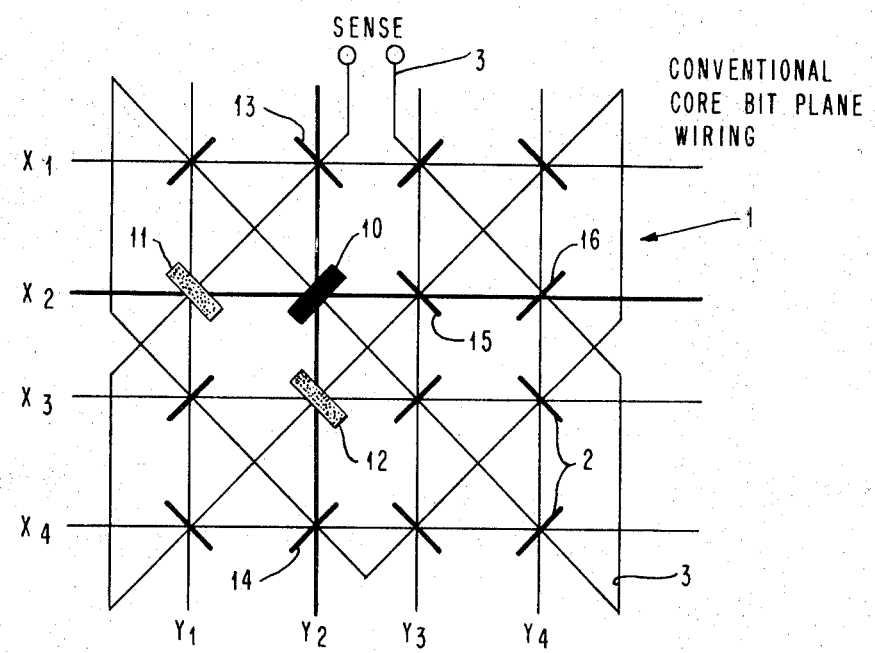
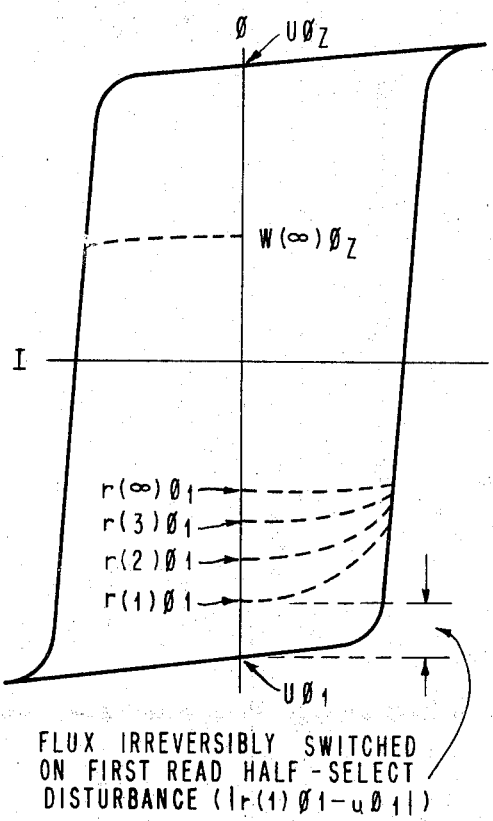
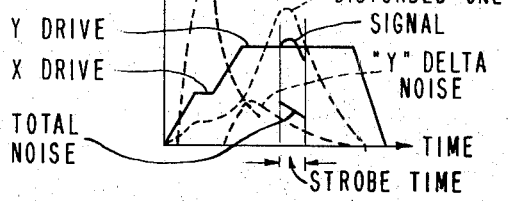

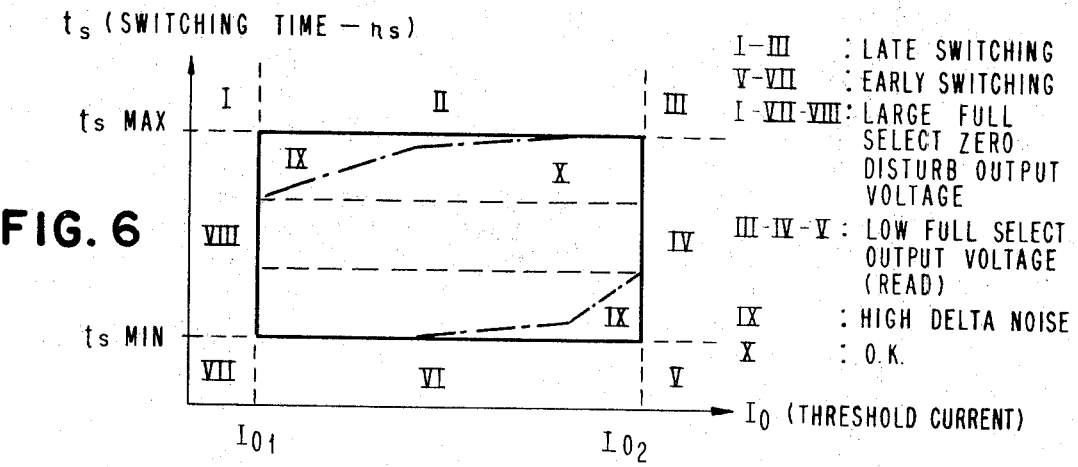
FIG. 5
FIG. 6
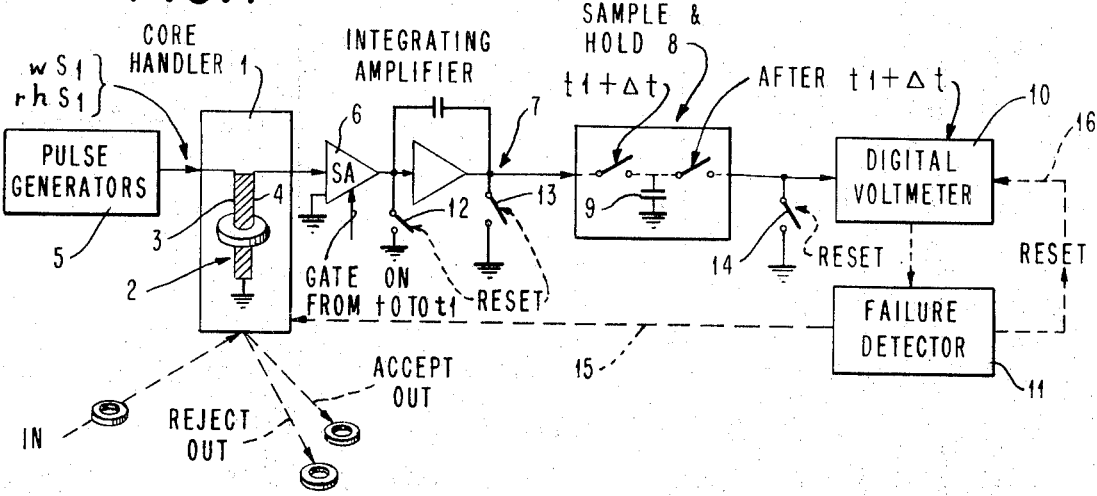
FIG. 7

1

3,532,970
TESTING MAGNETIC CORES FOR DELTA
NOISE QUALITY
Bela Gogos, Wappingers Falls, N.Y., John C. McClure,
Jr., Vienna, Va., and Jerald R. Rohling, Wappingers
Falls, N.Y., assignors to International Business Machines Corporation, Armonk, N.Y., a corporation of
New York
Filed Aug. 14, 1968, Ser. No. 752,628
Int. Cl. G01r 33/12
U.S. Cl. 324—34
9 Claims

ABSTRACT OF THE DISCLOSURE

A method and apparatus are disclosed for rapidly testing the delta noise quality of magnetic storage cores in production quantities. The test serves to determine the acceptability of each core for use in a coincident-current storage array. It measures the integral of output voltage produced by each core when disturbed from a predetermined stable magnetic state in response to a half-select drive current pulse of excitation. The excitation pulse is identical in shape and magnitude to the half-select read current pulse applied to a coincident-current storage array. Input drive current excitation and output voltage are respectively applied to and transferred from each test core through test handling means of conventional construction. The voltage time integral of response resulting from subject test, measured in millivolts, correlates with the microvolt level of instantaneous half-select voltage response which the test core would contribute to the total delta noise level of a complete array at sense strobing time. It is shown that the test is insensitive to extraneous random high frequency noise and produces easily repeatable results which are high in quality, performance, and yield of accepted cores.

BACKGROUND OF THE INVENTION

Field of the invention

The invention relates to a method and apparatus for testing discrete devices of a coincident-current magnetic storage array. In particular the tests apply to sub-miniature toroidal magnetic cores and serve as a basis for acceptance or rejection of individual cores for use in an array. The tests are designed to measure the potential contribution of each core to the total delta noise of a fully assembled array.

Delta noise is the effect produced on the sense line of a coincident-current array by the combined responses of partial selected cores which are in the same row and column of the array as a full selected core. The voltages induced on the sense line by partially selected cores may have magnitudes of the order of 100 microvolts per core at sense strobing time of an array. Such voltages combine additively in partially cancelling pairs to produce delta noise voltages proportional in amplitude to the number of partially selected pairs. The present invention is concerned with providing for each core an indirect measurement of its partial select voltage output at array strobing time which is not subject to the uncertainties of amplitude and time associated with a direct measurement of the instantaneous level of such voltages. The discovery which underlies the invention is that a parameter affording such an indirect measurement is available; specifically, the time integral of voltage output of the partially selected core taken over a full cycle of selection disturbance.

Description of the prior art

The prior art as exemplified by the disclosure of Pat. 2,711,509 to Endres et al. shows recognition of the importance of being able to determine, prior to construction of a coincident-current magnetic core storage array, the instantaneous noise voltages which will be produced by partially selected magnetic cores of the array at array strobing times. However, it is believed that such information was formerly obtained through direct sampling of instantaneous partial select output voltages at discrete critical strobing points of a test disturbance cycle. Such instantaneous sampling however does not readily distinguish the voltage components of delta noise from random high frequency noise and is limited in sensitivity by the low microvolt levels of instantaneous noise generally. There does not appear to have been any recognition in the art that the instantaneous noise of interest, which is usually measured in microvolts, is linearly related to the amplitude in millivolts of the time integral of half-select voltage response of the core taken over a full cycle of partial selection disturbance.

SUMMARY OF THE INVENTION

The invention therefore concerns a method and apparatus for indirectly measuring instantaneous microvolt level noise which a magnetic storage core might be expected to contribute, when partially selected, to the delta noise level at strobing time of a coincident-current magnetic storage array.

The indirect measurement of the test is relatively independent of time and the quantity which is measured by the test has a relatively large amplitude of the order of millivolts. This quantity represents the time integral of voltage output response of the core as the core is partially selected while in a predetermined magnetic state.

In a particular example of testing described herein each core is initially set to an undisturbed condition in one of its two stable magnetic states, by full select excitation of a given polarity. The core is then partially disturbed by one or more pulses of half-select excitation. The core is then again partially disturbed (i.e. half-selected) in the read sense and its voltage response is integrated over the period of partial disturbance. Acceptance of the core is conditioned at least in part upon the measured value of this integral. Core handling means of generally conventional construction is employed to transport the cores individually through a test station to accept-reject sorting positions. At the test station each core is inductively linked to a probe element adapted to supply desired excitation to the core and to transfer output voltages from the core. The probe has isolated drive and sense conductor portions suited to this purpose.

Related objects of the invention are to provide:

New and improved apparatus for testing magnetic cores in production quantities.

New and improved apparatus for testing a virtually instantaneous output voltage property of very small, partially selected, magnetic cores through linearly related non-instantaneous measurements of relatively large magnitude voltage properties of the same cores.

New and improved apparatus for indirectly testing the magnitude of the very small undesired noise voltage produced by a partially selected magnetic core at a particular instant of time in a selection cycle through measurement of a linearly correlated large magnitude voltage parameter developed over the full disturbance cycle.

New and improved method for testing the small delta noise voltages of small magnetic cores rapidly and reliably.

New and improved method for performing acceptance tests of magnetic cores, in production quantities, for incorporation of cores into a coincident-current magnetic storage array.

The foregoing and other objects, features and advantages of the invention will be apparent from the following more particular description of a preferred embodiment as illustrated in the accompanying drawings.

BRIEF DESCRIPTION OF THE DRAWINGS

FIG. 1 illustrates a typical bit plane of a three dimensional coincident-current array assembled from magnetic storage cores. This also represents the typical environment, for explanational purposes, in which the subject delta noise voltage effect is produced.

FIG. 2, illustrating the $\phi$–I characteristic of a typical square loop ferrite storage core, is used to explain the effect of irreversible flux switching associated with partial selection of a core. It is this effect which determines the core's potential increment of contribution to delta noise in an array.

FIG. 3a illustrates a typical half-select drive current pulse.

FIG. 3b illustrates the half-select output typically produced by a core when driven from an undisturbed magnetic "1" state in the demagnetizing direction in response to a half-select drive current pulse such as the pulse shown in FIG. 3a.

FIG. 3c illustrates output of a core in the "0" magnetic state when driven towards saturation by a half-select pulse such as that shown in FIG. 3a.

FIG. 3d indicates a "worst-case" difference between pulse output waveforms of the type shown in FIGS. 3b and 3c, representing a largest potential contribution to delta noise from a pair of half-selected cores in the same plane of an array as a selected core.

FIG. 4 illustrates voltage response of a fully selected core driven out of the "1" state by a full select current pulse in the read sense. Delta noise is illustrated comparatively in this figure. The strobing (sampling) time of the array sense apparatus, which is virtually an instant, is also indicated.

FIG. 5 illustrates the linear relationship, for a partially selected core, between the virtually instantaneous output voltage obtained from the core at array strobing time and the total change in irreversible flux produced in the core (as represented by the integral of partial select output voltage over a full cycle of partial disturbance). Note that the virtually instaneous output voltage is in microvolts while the equipment to provide the integral representation of total flux change, which would be measured in millivolt-nanoseconds, may be calibrated to be read in millivolts.

FIG. 6 indicates relative yields of acceptable cores obtained from prior tests and the present delta noise test. This figure indicates that the present test provides high yields of cores with good performance where earlier tests provided either high yields or good performance, but not both.

FIG. 7 illustrates a particular arrangement of apparatus for practicing the subject invention.

DETAILED DESCRIPTION OF THE INVENTION

As shown in FIG. 1 the bit plane portion 1 of a typical coincident-current storage array contains a number of cores, such as 2, each linked to two particular drive conductors for coincident-current selection. In the particular illustration each core is linked to one of the drive conductor $X_1$–$X_4$ in the X direction and one of the conductors $Y_1$–$Y_4$ in the Y direction. A sense conductor 3 is linked to all of the cores in the plane to allow for selective sensing of a single bit of stored binary information in response to coincident X and Y read drive current excitation. Of course, a number of such planes with separate sense windings are usually arranged to be driven to reproduce multiple bits of information simultaneously.

A core which is initially in an undisturbed magnetic state such as $u\phi_1$ (FIG. 2), which represents storage of binary 1 information, may be driven by partial select disturbances through a convergent series of states $r(n)\phi_1$ in the demagnetizing direction without a change in the information storage state. The output voltage induced on the sense line by a core partially read selected from the $\phi_1$ state is most pronounced in its lack of symmetry on the initial read out $uN_{h1}$ (FIG. 3b, $n=0$) from the undisturbed state $u\phi_1$ (FIG. 2), and become progressively less marked with each succeeding partial disturbance $r(n)N_{h1}$ (FIG. 3b, $n=1$). The polarity of this output voltage is arbitrary and depends only on the coupling of the core to the drive and sense windings. A core in the opposite storage state $\phi_z$ upon being partially read-disturbed produces the more symmetrical sense voltage output $r(n)V_{hz}$ (FIG. 3c).

In the worst case of incremental contribution to delta noise, a pair of cores in a plane, which have been wired to produce cancelling partial disturb sense voltage outputs, would produce a combined output waveform such as that shown in FIG. 3d (difference between waveforms of FIGS. 3b and 3c with a slowly decaying trailing characteristic. As shown in FIG. 4, the actual delta noise signal which might result from the additive combination of a number of such incompletely cancelled half-select signals has a magnitude which is quite significant in relation to the amplitude, $V_{out}$, of the information signal produced by a selected core in the $\phi_1$ state. Thus, it is both desirable and necessary to limit delta noise by quality control acceptance tests of cores prior to assembly of a coincident current array.

Referring to FIGS. 1 and 4, and assuming that core 10 (heavy lines, FIG. 1) has been selected for read out while in the $\phi_1$ state, we see that the output voltage, $V_{out}$, on sense line 3 would be given by:

$$V_{out} = V_s - V_{hs_x} - V_{hs_y}$$
$$\pm \frac{(N_x - 2)}{2}(V_{\delta x}) \pm \frac{(N_y - 2)}{2}(V_{\delta y})$$

where, $V_s$ = the voltage output of the selected core 10

$V_{hs_x}, V_{hs_y}$ = voltage outputs of half-selected cores 11, 12 (shaded lines) which are paired for delta noise cancellation with the selected one $N_x(N_y)$ = number of cores in row x (column y) of selected core (i.e. for FIG. 1 these would be 4)

$V_{\delta x}(V_{\delta y})$ = combined voltage outputs (delta noise) of the paired half-selected cores in row x (column y), cores 13 and 14 (15 and 16).

From FIG. 4 it is evident that at strobing (strobe) time the effective output signal is diminished by the amplitude of total delta noise.

We have noted through empirical observations (FIG. 5) that the contribution to delta noise of any half-selected core is related linearly to the time integral of voltage output of the same core over a cycle of half-select disturbance. This in turn is due to the existence of a linear relationship between the total flux irreversibly switch during the half-selection and the noise voltage output of the core in the strobing period (FIG. 2).

The relationship of FIG. 5 has been verified to hold true for a number of different compositions of ferrite materials, and is believed to be applicable in general to all devices exhibiting square hysteresis characteristics, provided of course that the amplitude of the applied half-select current pulse does not exceed the threshold current which would drive the cores past the knees of their hysteresis curves.

From this relationship, it is quite apparent that delta noise tests based for example on a limit of acceptance of 100 microvolts of instantaneous noise at strobing time, would be equivalent to although less effective than acceptance tests based on a limit of acceptance of 200 millivolts-nanoseconds of irreversible flux measured by integrating the half-select voltage output over a full cycle of half-selection.

In a half-select period on the order of 800 nanoseconds, such as suggested in FIG. 3a, the strobing instant may have an uncertainty of position in time of 50 nanoseconds or less. Due to the steep slope of the noise signal over the strobing interval any slight variation in sampling time results in large error in the measurement of instantaneous noise voltage amplitude. Thus, the present integral voltage measurement is an order of magnitude larger in amplitude and more stable in time, and therefore more manageable, than the measurement of instant noise voltage at strobing time.

An example of apparatus to perform the subject integral test is shown in FIG. 7. Here the cores are automatically handled one at a time through the test station by core handling equipment 1, of known construction. At the test station each core is contacted by a probe 2 of known construction, which includes electrically isolated drive and sense conductors 3 and 4, to effect predetermined inductive linkages to the core under test. Pulse generators 5 are programmed to supply drive excitation pulses to the test core in a predetermined sequence, whereby the test core is set first to an undisturbed "1" state ($u\phi_1$) and then disturbed, without a change of state, by one or more half-select disturb current pulses. Then a half-select current pulse in the read sense is applied to the core and the resulting voltage response is gated through sense amplifier 6. The sense amplifier output is integrated by operational integrating amplifier circuit 7 over the interval $t_0-t_1$ (FIG. 3a) spanning the interval of half-selection. Integrating amplifier 7 produces a gradually rising voltage which after $t_1$ has a constant amplitude (in millivolts) linearly proportional (FIG. 5) to the instantaneous microvolt level at strobing time of the direct output of the core.

At some arbitrary instant of time after $t_1$ (e.g. $t_1+\Delta t$) sample and hold circuit 8 is operated to store (e.g. on a capacitor 9) the integrated voltage output of integrating amplifier 7. This voltage tends to remain constant after $t_1$ because the core output is then constant and the sense amplifier is ungated.

At some arbitrary time after the integral voltage has been stored in sample and hold circuit 8 (i.e. after $t_1+\Delta t$) the input to this circuit is interrupted and a measuring instrument such as digital voltmeter 10, is operated to provide an indication, calibrated to be read in millivolts, of the voltage stored at 8. A level detector may also be used for this purpose instead of a voltmeter. This indication is used to control accept-reject sorting of the tested cores.

Acceptance/rejection control may be automatic. For example, in the particular situation shown in the drawing a level detector circuit 11, set to discriminate levels of integrated voltage above a threshold of 200 millivolts (corresponding for evample to 100 microvolts of instantaneous contribution to delta noise as indicated in FIG. 5), would operate an accept-reject gate (not shown) in core handler 1 to differentiate between acceptable and unacceptable cores.

After the acceptability of a test core has been ascertained the system is reset by discharge of the charged capacitors in the integrating and sample and hold circuits, for example by closure of switches 12–14, and the core handler and voltmeter are readied for the next core test, for example through control connections suggested at 15 and 16.

It should be understood that the level detector would not be necessary if speed and automation of testing were not desired. Then the voltmeter and manual control would suffice.

A few observations should be made concerning the effects of the subject test. It was known to earlier workers in this field that delta noise is related to the squareness of the hysteresis loop and the threshold currents at which switching begins. They would select cores having thresholds between predetermined limits (e.g. $Io_1-Io_2$, FIG. 6) by measuring response amplitudes of the cores when driven from the infinitely disturbed one and zero states by full select current pulses. This naturally would involve numerous cycles of partial disturbance. Furthermore, squareness of hysteresis being associated with switching time, it was customary to select cores with satisfactory switching times by observing the response of the core in a specified "one" state (either disturbed or undisturbed) to full select read excitation. These selection criteria however, being only coarsely representative of device performance, were unsuited to produce high yield and high quality. Cores within the high yield poor performance boundary (FIG. 6) could have unacceptable delta noise properties (IX) and yet be selected as acceptable.

It was also known that the delta noise factor of a core could be tested more accurately by time-consuming (minutes per sample core) sensitive measurements of instantaneous disturb voltage, still with considerable uncertainty of quality of selection.

The present test, requiring only miliseconds of time per core, and millivolt levels of voltage measurement at arbitrary, or at least uncritical, sampling times, is clearly faster, more accurate since it checks every core, and less sensitive to variations in the test apparatus. It also is more effective in yield since it eliminates cores with poor delta noise properties while still providing a relatively high yield of acceptable cores. Thus where earlier tests tended to produce either high yields of cores some with poor quality of performance (regions IX and X in FIG. 6) or low yields of cores with uniformly high quality performance (portion of region X, FIG. 6 within low yield good performance boundary), the present test provides moderately high yields with uniformly high quality performance and requires only a fraction of the time formerly needed for equivalent selectiveness of testing.

It should be understood that the precise shape and duration of the half-select currents used in the present test are not critical. If the drive current rise time, fall time, or duration should vary slightly the integral of core output voltage should remain constant. Thus, test results are not only uniform in quality and yield and less sensitive, but also more easily repeatable.

While the invention has been particularly shown and described with reference to a preferred embodiment thereof it will be understood by those skilled in the art that various changes in form and detail may be made therein without departing from the true spirit and scope of the invention as claimed herein.

We claim:

1. Delta noise monitoring apparatus for testing magnetic cores for incorporation in a coincident-current type storage array comprising:
 means for applying a sequence of pulses to individual cores being tested for delta noise quality to switch each core as it is tested first to an initial undistributed state of stable magnetization and then to a modified condition in the same state;
 means controlled by a gating pulse coinciding with only a selected single one of the condition modifying pulses of a said sequence for amplifying the output signal produced by each core in response to said single condition modifying pulse;
 means for integrating the output of said gated amplifying means over an interval spanning the full duration of said single condition modifying pulse;
 means for sampling and holding a representation of the indication magnitude of the output of said integrating means at the end of said interval; and
 means for distinguishing the delta noise quality of cores tested based upon the representation held by said sampling and holding means.

2. The method of testing delta noise quality of cores for selection of cores for inclusion in a coincident-current storage array comprising the steps of:
 applying a sequence of delta noise test pulses to each core, said sequence including a first pulse which sets the core to a predetermined state of undisturbed magnetic flux remanence corresponding to storage of a binary one and at least one second pulse which simulates half read selection of the core and thereby partially disturbs the core from said predetermined state in the direction of the opposite (binary zero) storage state;

deriving, while a specific one of said second pulses is being applied, an indication representative of the integral taken over the full interval of application of said second pulse of only the output voltage signal produced by the core in response to said specific second pulse; and selecting each of said tested cores for assembly into an array or rejection on the basis of the magnitude of said derived representative integral indication, considered as a specific indication of the delta noise quality of the respective core.

3. Delta noise monitoring apparatus for testing magnetic cores for incorporation in a coincident-current storage array comprising:

means providing standardized drive and sense signal couplings to a core having a given state of magnetization;

means coupled to said drive coupling means for applying a sequence of equal amplitude equal duration half-select pulses which partially disturb the core in said given state in the read-out sense; and means coupled to said sense coupling means for producing an indication representative of the integral of voltage output from said core taken over an interval spanning a selected one and only one of said half-select pulses said indication indicating the delta noise quality of the core.

4. The delta noise monitoring apparatus of claim 3 including means for applying an initial pulse to set the core in said given state prior to said specified half-select pulse sequence.

5. The test apparatus of claim 4 including:

detecting means for detecting an output from said indication producing means representative of a voltage-integral magnitude in excess of a given voltage level; and means operated by said detecting means for conditioning the further handling of said core selectively on the output of said detecting means.

6. The apparatus of claim 5 wherein said detecting means includes:

a sample and hold circuit operated upon termination of said selected one only of said half-select pulses to store the instantaneous output of said representative indication producing means; and voltage measuring means connectable to said sample and hold circuit to indicate the condition thereof following a sampling and holding operation thereof.

7. The apparatus of claim 6 including resetting means for resetting the said representative indication producing means and the said sample and hold circuit after operation of said core handling conditioning means.

8. The apparatus of claim 7 wherein said representative indication producing means comprises an operational integrating amplifier with gated input controlled by a gating pulse coinciding with said one only of said half-select pulses.

9. Apparatus for rapidly conducting acceptance tests of magnetic storage cores, in production quantities, comprising:

core handling means for handling a supply of said cores, one at a time, through a test station to output accept and reject stations whereat cores are respectively accepted, for incorporation into a storage array, and discarded;

said core handling means including probe means with electrically isolated drive and sense conductor portions for establishing predetermined drive and sense inductive signal linkages to each core passing through the test station;

a source of programmed drive pulse excitation coupled to said drive conductor portion of said probing means and operated in coordination with said core handling means to apply to each core linked to said probe means first drive pulse of given polarity and at least one second drive pulse of opposite polarity;

said first pulse simulating a write pulse setting said linked core to a first predetermined state of binary one magnetic flux storage;

said second pulse simulating read half-select disturbance of the same core in said first state;

means controlled by a gating pulse coinciding with a specific one of said second pulses coupled to said sense conductor portion of said probing means for amplifying the output of each said core in response only to said specific one of said second pulses;

means coupled to said gated amplifying means for integrating said amplified output over a period of integration spanning said gating pulse;

means coupled to said integrating means for detecting the output thereof as a delta noise quality indication after each said period of integration; and means coupled to said detecting means for conditioning said core handling means to selectively transfer the core presently linked to said probe means to said accept or reject station, and to reset said apparatus in preparation for receiving and testing another core.

References Cited

UNITED STATES PATENTS 2,679,025  5/1954  Rajchman et al. _____ 324—34
2,934,696  4/1960  Williams et al. _____ 324—34

RUDOLPH V. ROLINEC, Primary Examiner

R. J. CORCORAN, Assistant Examiner